United States Patent

[11] 3,568,119

| | | |
|---|---|---|
| [72] | Inventor | Myron C. Ruderman<br>Plainview, N.Y. |
| [21] | Appl. No. | 853,080 |
| [22] | Filed | Aug. 26, 1969 |
| [45] | Patented | Mar. 2, 1971 |
| [73] | Assignee | Aeroflex Laboratories Incorporated |

[54] DYNAMIC TRANSFORMER
4 Claims, 2 Drawing Figs.

[52] U.S. Cl. .................................................... 336/135, 318/654
[51] Int. Cl. ...................................................... H01f 21/06
[50] Field of Search .......................................... 336/130, 132, 134, 135; 318/(20.75, 654)

[56] References Cited
UNITED STATES PATENTS

| 2,488,734 | 11/1949 | Mueller...................... | 336/135 |
| 2,669,126 | 2/1954 | Simmons et al............... | 336/135X |
| 2,864,066 | 12/1958 | Egbent et al.................. | 336/134 |
| 3,085,192 | 4/1963 | Maier........................... | 336/135X |

*Primary Examiner*—Thomas J. Kozma
*Attorney*—Laurence B. Dodds

ABSTRACT: A dynamic transformer comprises input terminals for supplying an alternating-current control signal and an alternating current slotted-ring stator having two nondistributed exciting windings each of which comprises two equal diametrically opposed sections. Each winding section embraces a predetermined sector of the stator ring and the winding sections are equally spaced about the stator $360°/2n \pm \frac{1}{2}$ of the sector. The windings are excited in phase from input terminals. The transformer also comprises two distributed output windings on the stator ring, each winding comprising two equal diametrically opposed sections and each winding section embracing the same sector of the stator as one of the exciting winding sections and each output winding section being divided into two equal adjacent portions connected in series opposition. The transformer has a rotor of low-loss magnetic material having eight salient poles, each of the poles having a width approximately one-half of the aforesaid stator sector width. The transformer is effective to develop in the output windings two-phase signals of an amplitude dependent upon the amplitude of the input control signal.

DYNAMIC TRANSFORMER

BACKGROUND OF THE INVENTION

Heretofore there have been provided dynamic transformers useful for a variety of purposes, for example as torque motors. In general, any motor can be classed as a torque motor but the term is usually applied to a motor which is not continuously rotatable and, in particular cases, is capable of movement through only a limited angle. Such motors are widely used in servomechanisms.

Such a dynamic transformer also has application as an angular position-sensing device of high precision, also useful in servomechanism systems, and the invention will be specifically described in such an environment.

Dynamic transformers heretofore available have been relatively complex and costly and have not met the sensitivity and accuracy requirements of many applications.

It is an object of the invention to provide a new and improved dynamic transformer which is relatively simple and inexpensive in construction and has extreme sensitivity and accuracy.

SUMMARY OF THE INVENTION

In accordance with the invention, there is provided a dynamic transformer comprising input for supplying an alternating-current control signal, an alternating-current slotted-ring stator having a plurality of an $n$ exciting windings, each embracing a predetermined sector of the stator ring and the exciting windings being equally spaced by $360°/2n \pm 1$-$nth$ of the sector, and connections between the input terminals and the exciting windings to excite them in phase. The transformer further comprises a plurality of $n$ output windings on the stator ring, each embracing the same sector thereof as one of the exciting windings and divided into two equal adjacent portions connected in series opposition, and a rotor of low-loss magnetic material having $m$ $n$ salient poles, where $m$ is an even integer, each of such poles having a width approximately one-half half the predetermined stator sector, whereby there is developed in the output windings $n$-phase signals of $m$ cycles per rotor revolution and of amplitude dependent upon the amplitude of the input control signal.

For a better understanding of the present invention, together with other and further objects thereof, reference is had to the following description, taken in connection with the accompanying drawing, while its scope will be pointed out in the appended claims.

BRIEF DESCRIPTION OF THE DRAWING

FIG. 1 is a schematic end view of a dynamic transformer embodying the invention, while

DESCRIPTION OF THE PREFERRED EMBODIMENT

Figure 1:
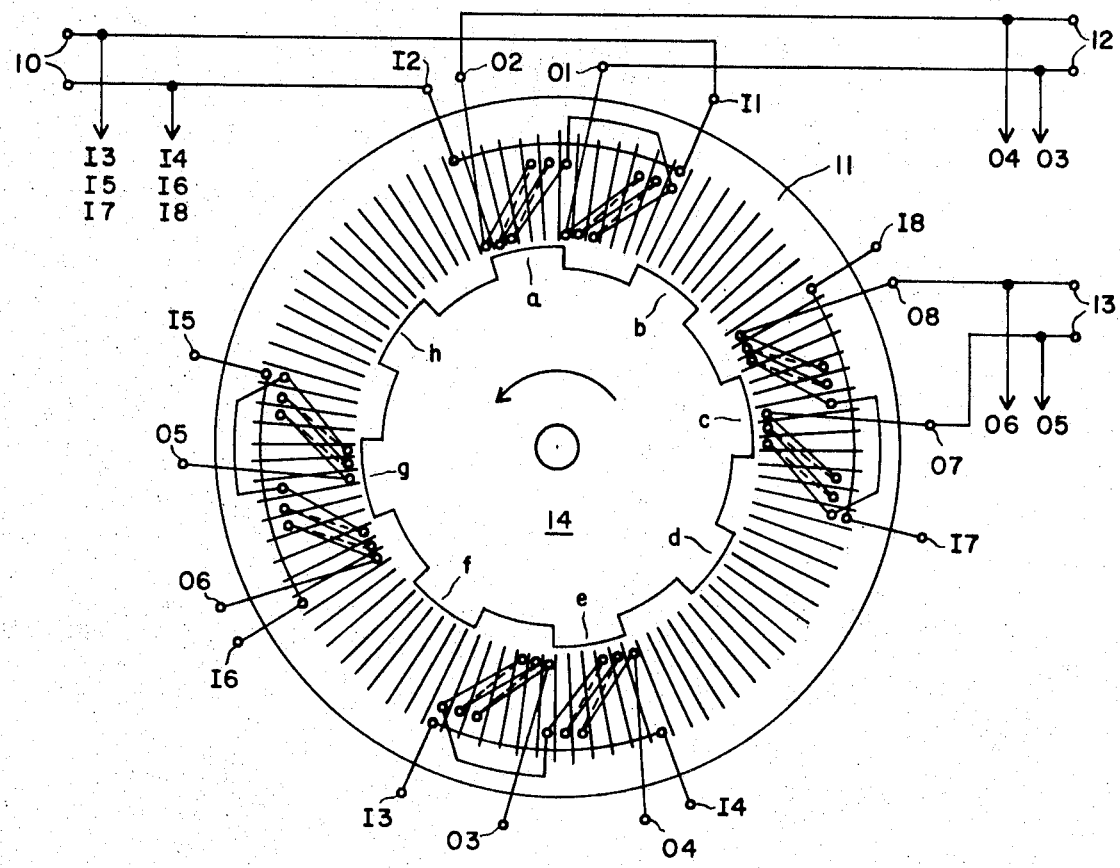

Referring now to FIG. 1 of the drawings, there is represented a dynamic transformer embodying the invention including a pair of input terminals 10 for supplying an alternating-current slotted-ring stator 11. The stator 11 is shown as having 96 winding slots, the stator teeth separating the slots being shown merely as lines for the sake of simplicity. The stator 11 has two nondistributed input or exciting windings each comprising two equal diametrically opposed sections, specifically the winding sections I1—I2 and I3—I4 comprising one exciting winding sections I5—I6 and I7—I8 comprising the other exciting winding. The division of each input winding into diametrically opposed sections is effective to compensate for any eccentricity between the rotor and stator. Each of the winding sections embraces a predetermined sector of the stator ring comprising 13 winding slots. For simplicity, each of the exciting winding sections is shown as a single turn although, actually, a multiturn winding is preferred. The several winding sections I1—I2 to I7—I8 are equally spaced around the stator ring by $360°/2n \pm 1$-$nth$ of the width of the sector embraced by each winding section. Specifically, with the winding sections as shown, the winding section I1—I2 is displaced from the winding section I5—I6 by 90°+ one-half of the width of the sector while the winding section I1—I2 is spaced from the winding section I7—I8 by 90° —½of the width of the sector. The winding section I3—I4 bears a corresponding relationship to the winding sections I5—I6 and I7—I8.

As indicated schematically in FIG. 1, the several winding sections I1—I2 to I7—I8 are adapted to be excited in phase as being connected in parallel across the input terminals 10.

The dynamic transformer of the invention further comprises two output windings on the stator ring 11, specifically the output windings comprising distributed winding section 01—02 to 07—08, each of the winding sections embracing the same sector of the stator 11 as a corresponding one of the exciting winding section. The use of distributed output windings is effective to develop a substantially sinusoidal modulation output signal. Each of the output winding sections to 07—08 is, as shown, divided into two equal adjacent portions connected to output terminals 12 while the winding sections 05—06 and 07—08 are connected to output terminals 13 as shown.

The dynamic transformer of the invention further comprises a rotor 14 of low-loss magnetic material having 8 equally spaced salient poles $a-h$, inclusive, each of the poles having a width approximately one-half of the width of a stator sector embraced by each of the input and output winding sections.

In considering the operation of the dynamic transformer described, it can be assumed that, initially, the rotor and stator are in the relative positions shown in FIG. 1 and that a 60-cycle alternating current signal is applied to input terminals 10. The rotor poles $a$ and $e$ provide a minimum reluctance in the path of the CCW portions of the output winding sections 01—02 and 03—04 and a maximum coupling between these winding portions and the respective input winding sections I1—I2 and I3—I4, respectively, and a maximum reluctance in the path of the CW portions of the output winding sections 01—02 and 03—04 and a minimum coupling between these winding portions and their respective input winding sections. As a consequence, these output winding sections develop and apply to the output terminals 12 a maximum signal.

At the same time, the rotor poles $c$ and $g$ are symmetrically located with respect to the output winding sections 05—06 and 07—08 so that the signals developed in the oppositely connected portions of each of these winding sections balance out and a substantially zero signal is applied from these output winding sections to the terminals 13. While the winding sections of each of the output windings are schematically shown in parallel, it is clear that they may be connected in series if desired.

Now assuming that the rotor 14 is advanced CCW by a distance corresponding to one-half winding sector, in which case the situation will be reversed, namely, a substantially zero signal output applied to the output terminals 12 and a maximum signal output applied to the output terminals 13, and this sequence is repeated as the rotor 14 continues its rotation. Assuming that the rotor 14 rotates with respect to the stator, with excitation of frequency $f$ of the input control signal at terminals 10, there are developed at the output terminals 12, 13 signals of the same frequency as the input signal but having two-phase modulation in amplitude at the frequency corresponding to the speed of rotation of the rotor 14. On the other hand, if the rotor 14 is stationary or is moving at a speed negligible relative to the synchronous speed of the device, there are developed at the output terminals 12 and 13 two output signals of an amplitude dependent upon the position of the rotor 14 and varying with the amplitude of the input control signal at terminals 10.

Figure 2:
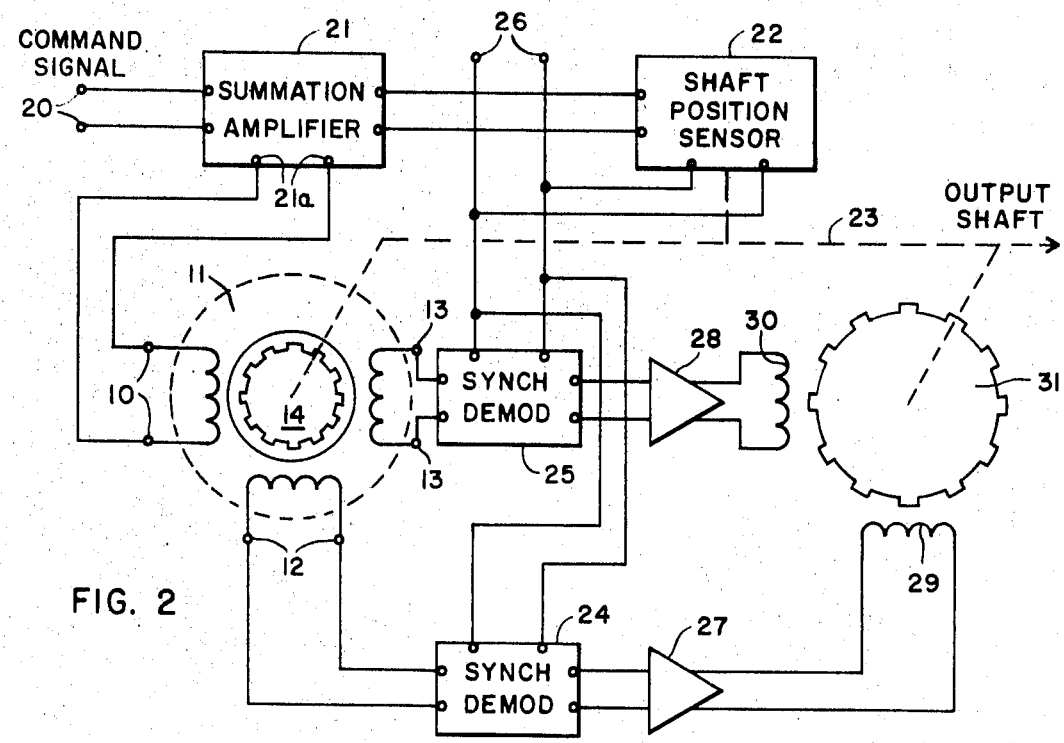
FIG. 2 is a circuit diagram of a complete servomechanism system incorporating the dynamic transformer of the invention.

Referring now to FIG. 2 of the drawing, there is shown schematically a servomechanism system for positioning an output shaft in accordance with an input or command signal and embodying the dynamic transformer of the invention. This system comprises input terminals 20 to which is applied a command signal which, in turn, is applied to a summation amplifier 21 which develops an error signal equal to the algebraic sum of its two input signals. A shaft rotation sensor 22, of any conventional type, is mounted on an output shaft 23 and develops a signal continuously representative of the position of the shaft 23 and applies it to the summation amplifier 21 which develops at its output terminals 21a an error signal which is applied to input terminals 10 of the dynamic transformer 11, 14.

The output signals at the terminals 12 and 13 are applied to synchronous demodulators 24 and 25, respectively, to which is also applied a reference alternating current signal from input terminals 26 which is also applied to the shaft position sensor 22. Since both of the inputs to the demodulators are derived from common input terminals 26, these devices, which may be of conventional form, develop two-phase modulation signals which are applied via amplifiers 27 and 28, respectively to two phase windings 29 and 30 which, with a permanent-magnet rotor 31, comprise a torque motor. The torque motor drives the output or load shaft shown schematically at 23 and this shaft is connected to the rotor 14.

The servomechanism of FIG. 2 operates in a conventional manner. For example, assume that the system is in equilibrium so that no error signal is developed by amplifier 21. If then, the command signal applied to terminals 20 is altered, there is developed by the amplifier 21 an alternating current error signal of an amplitude proportional to the difference between the position of the shaft 23 and that corresponding to the new command signal. This error signal, applied to the terminals 10, causes the dynamic transformer 11, 14 to develop and apply to the output terminals 12, 13 two-phase signals the relative instantaneous amplitudes of which are also representative of the new command signal. These two modulated signals are detected in the demodulators 24 and 25, respectively, and, via amplifiers 27, 28, applied to the windings 29, 30 of the torque motor, causing the rotor 31 of the latter to drive the output shaft to a position in correspondence with the new command signal and, concurrently, to drive the rotor 14 in a sense to reduce the error signal output of amplifier 21 to zero. The system is thus restored to equilibrium with output shaft 23 adjusted to a position corresponding to the new command signal.

Thus it is seen that the dynamic transformer in accordance with the invention comprises a relatively simple construction including a simple unwound magnetic rotor and avoiding the requirement of commutators, slip rings, and attendant brushes. At the same time, by the use of a stator having a large number of winding slots and a rotor with a large number of poles, the device becomes extremely sensitive to small variations in the input signal to the terminals 10 and develops signals at the output terminals 12, 13 constituting an accurate representation of the amplitude of the signal input to terminals 10.

I claim:

1. A dynamic transformer comprising:
    input terminals for supplying an alternating-current control signal;
    an alternating current slotted-ring stator having a plurality of $n$ exciting windings, each embracing a predetermined sector of the stator ring and said windings being equally spaced by $360°/2n \pm 1$-$nth$ of said sector;
    connections between said input terminals and said windings to excite them in phase;
    a plurality of $n$ output windings on said stator ring, each embracing the same sector thereof as one of said exciting windings and divided into two equal adjacent portions connected in series opposition;
    and a rotor of low-loss magnetic material having $m\ n$ salient poles, where $m$ is an even integer, each of said poles having a width approximately one-half said predetermined stator sector,
    whereby there is developed in said output windings $n$-phase signals of $m$ cycles per rotor revolution and of amplitude dependent upon the amplitude of the input control signal.

2. A dynamic transformer in accordance with claim 1 in which each of said exciting windings and each of said output windings comprise two equal diametrically opposed sections.

3. A dynamic transformer in accordance with claim 1 in which each of said exciting windings is an nondistributed winding and each of said output windings is a distributed winding.

4. A dynamic transformer in accordance with claim 1 in which the parameter $n = 2$ and the parameter $m = 4$.